Dec. 29, 1925.  1,567,272
R. McC. JOHNSTONE
GRINDING APPARATUS
Filed April 4, 1921   5 Sheets-Sheet 3
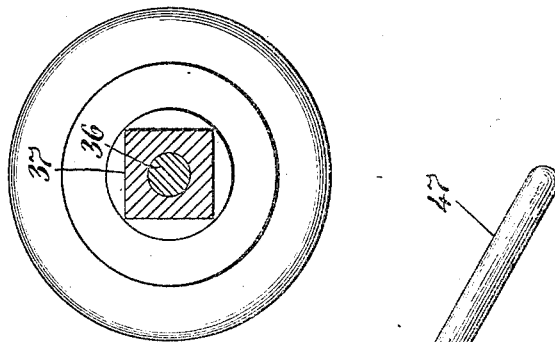
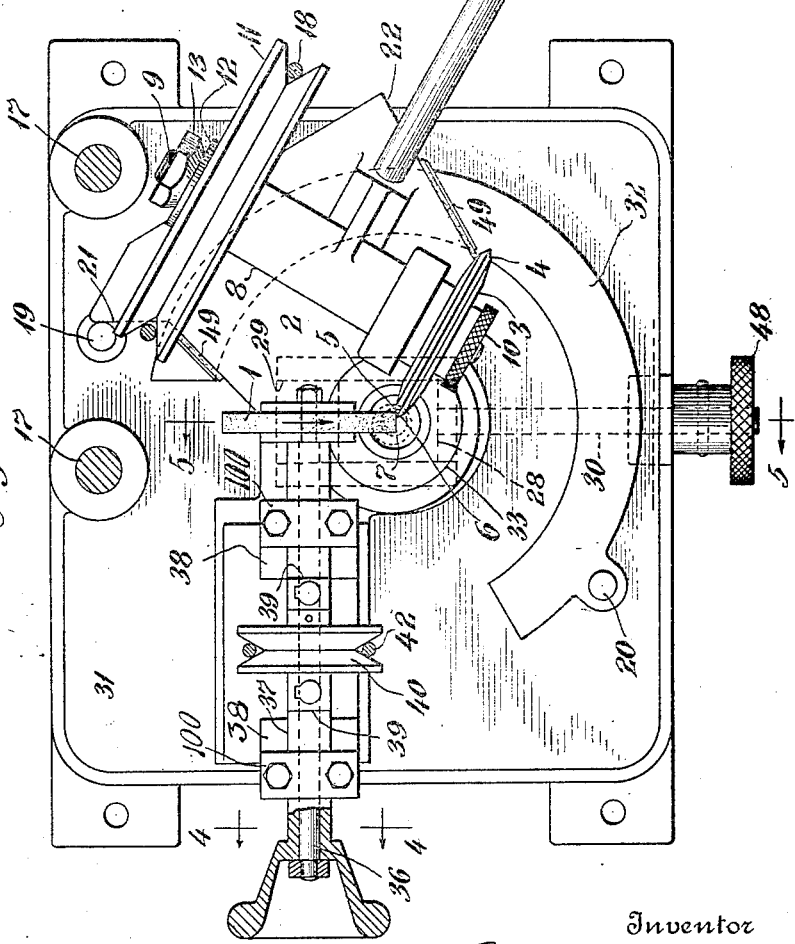
Inventor
Robert McC. Johnstone
By his Attorney

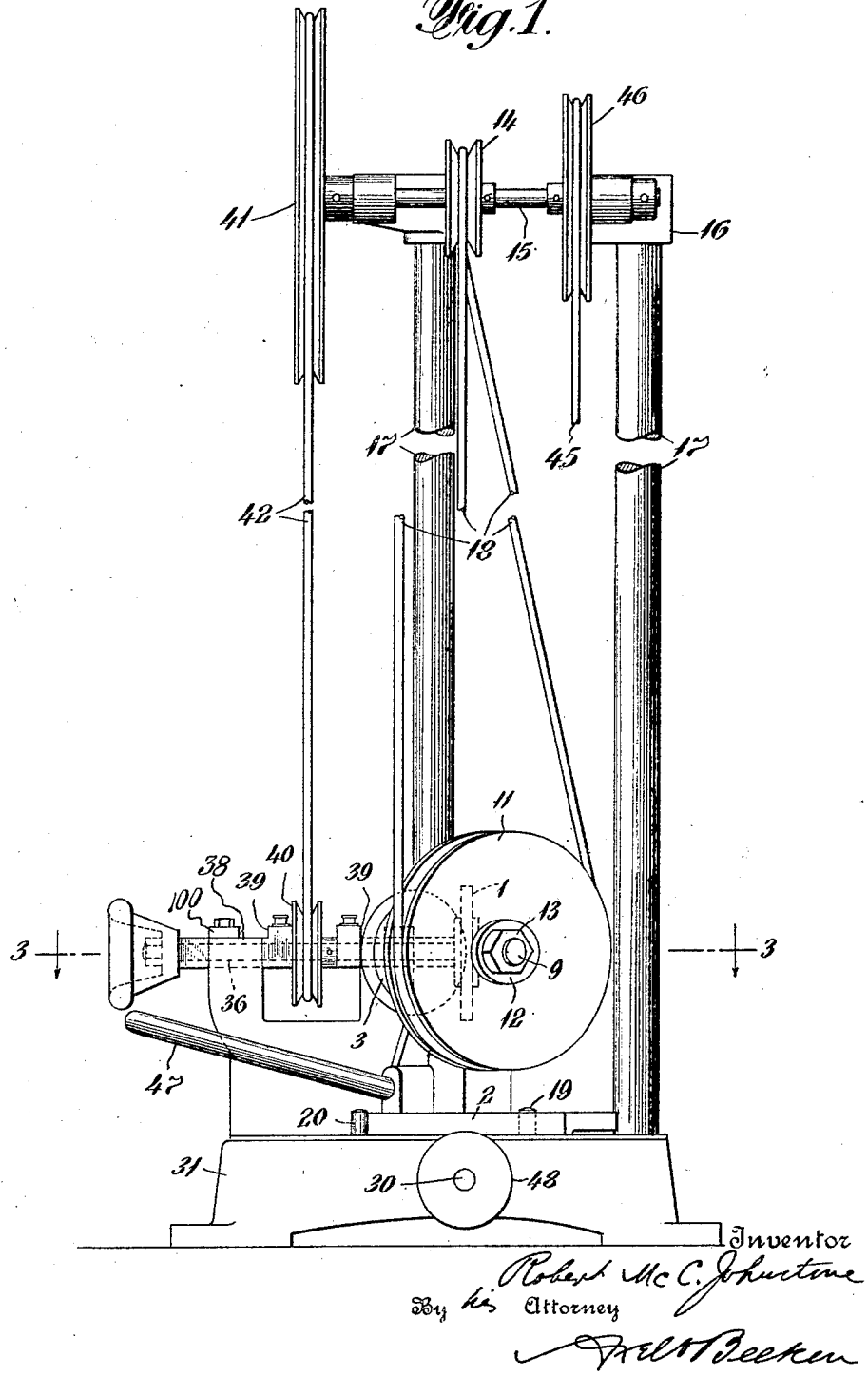

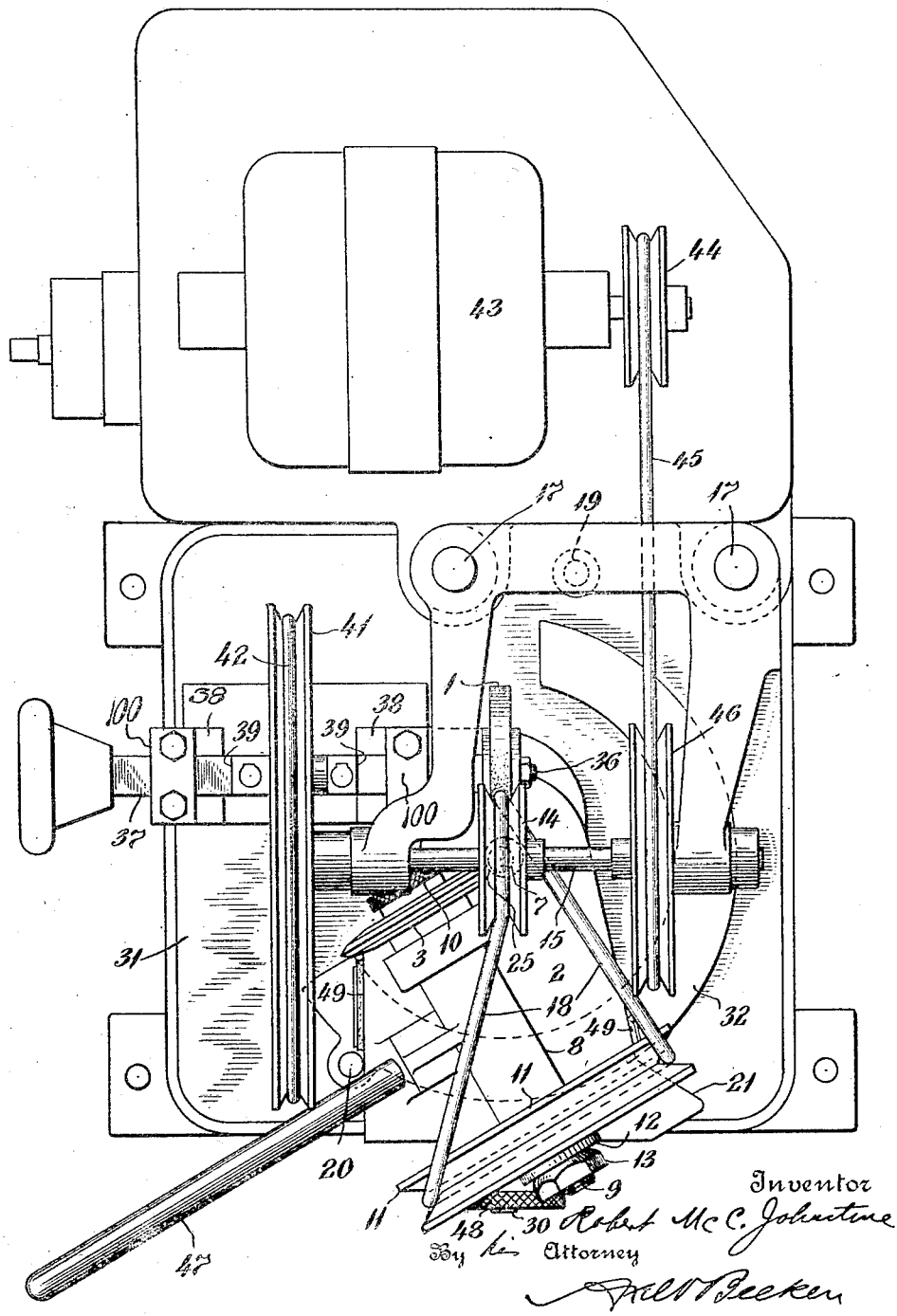

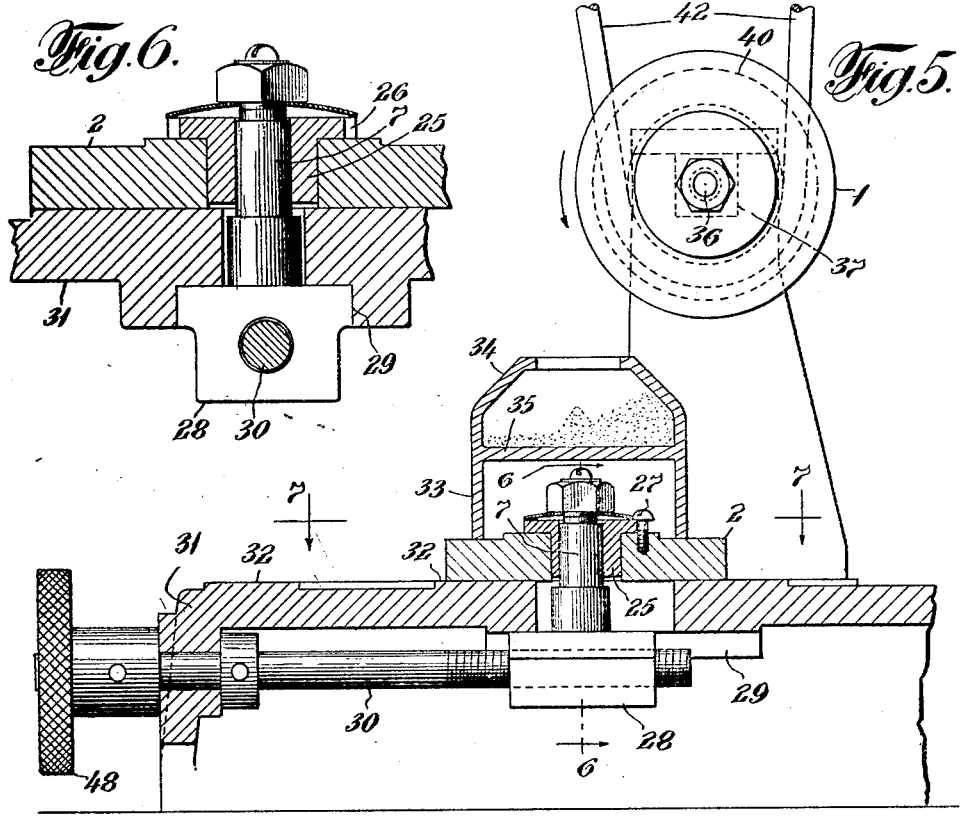
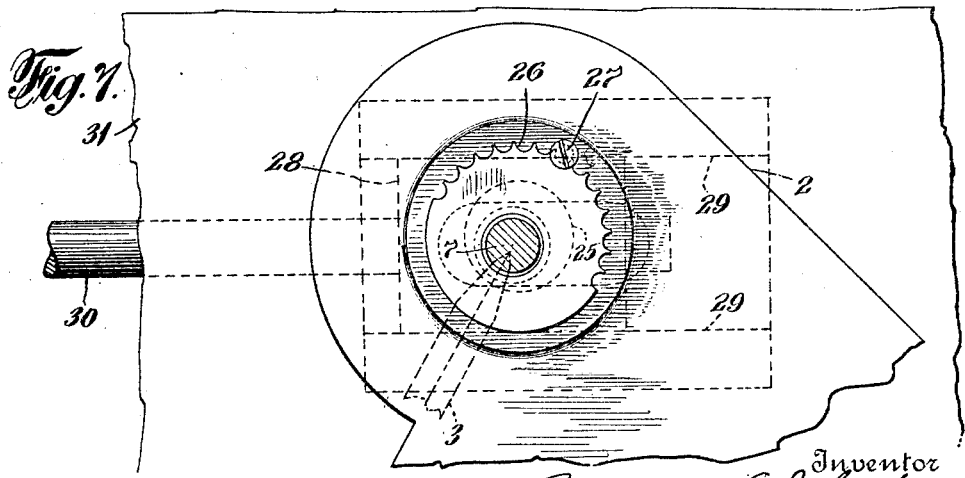

Dec. 29, 1925.
R. McC. JOHNSTONE
GRINDING APPARATUS
Filed April 4, 1921
1,567,272
5 Sheets-Sheet 5
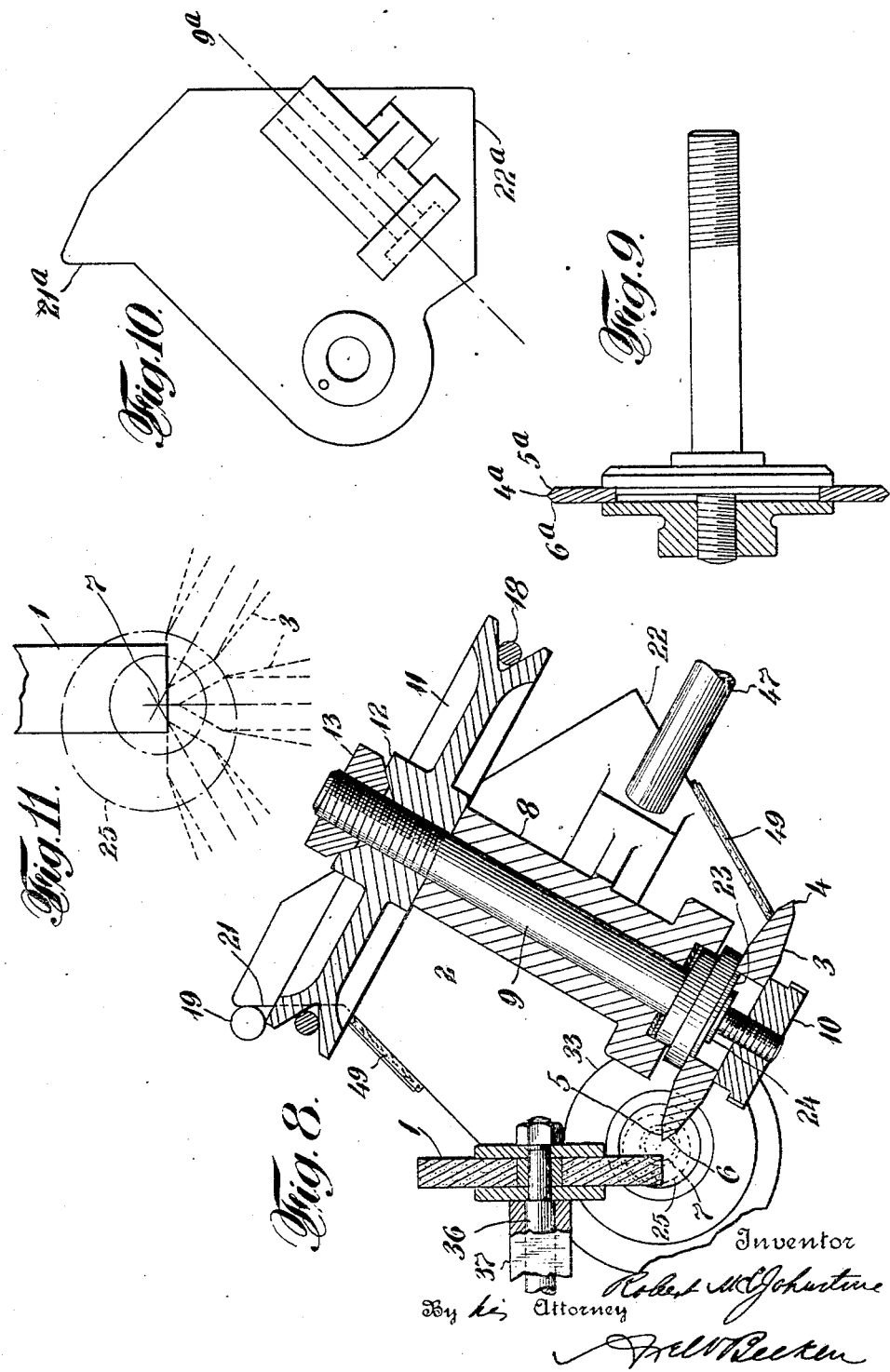

Patented Dec. 29, 1925.

1,567,272

UNITED STATES PATENT OFFICE.

ROBERT McC. JOHNSTONE, OF ROSELLE PARK, NEW JERSEY, ASSIGNOR TO CAMERON MACHINE COMPANY, OF BROOKLYN, NEW YORK, A CORPORATION OF NEW YORK.

GRINDING APPARATUS.

Application filed April 4, 1921. Serial No. 458,443.

To all whom it may concern:

Be it known that I, ROBERT McC. JOHNSTONE, a citizen of the United States, and a resident of Roselle Park, in the county of Union and State of New Jersey, have invented certain new and useful Improvements in Grinding Apparatus, of which the following is a specification.

This invention relates to grinding machines and has for its main object and feature the production of a machine that will accurately grind opposite sloping surfaces of a cutter having a peripheral cutting edge.

Fig. 1 is a front elevation of a grinding machine embodying the invention, with parts broken away.

Fig. 2 is a top plan view of the machine shown in Fig. 1 with the work holder swung into one position.

Fig. 3 is a horizontal sectional view on the plane of line 3—3 of Fig. 1, with the work holder swung into another position.

Fig. 4 is a detail sectional view on the plane of line 4—4 of Fig. 3.

Fig. 5 is a vertical sectional detail view substantially on the plane of line 5—5 of Fig. 3.

Fig. 6 is a detail vertical sectional view on the plane of line 6—6 of Fig. 5.

Fig. 7 is a horizontal sectional view on the plane of line 7—7 of Fig. 6.

Fig. 8 is a horizontal section through the work holder and adjacent elements.

Fig. 9 is a horizontal sectional view of a modified form of cutter holder.

Fig. 10 is a plan view of a modified form of work holder.

Fig. 11 is a diagrammatic view showing the relation of the work to the grinding wheel.

1 indicates the grinding element and 2 is the work holder. Suitable means are provided for so moving these two elements with respect to each other that different angular faces of the work may be brought into parallelism or other proper relation with the plane of the face of the grinding element. Obviously, either the work holder or the grinding element may be moved with respect to the other, or both may be so moved, to accomplish this result. In the present instance, the work to be ground or sharpened is a circular cutter 3 having a relatively blunt peripheral cutting edge 4 produced by two angular faces 5 and 6. A circular cutter of this character is known as a "score-cutter" and is here intended to be used as a slitting element in a machine for slitting and winding paper such as is shown, for instance, in Patent No. 1,076,189 of October 21, 1913. It will be understood that it is highly desirable that the cutting edge be equidistant from the sides of the cutter in order that the paper may be slitted at the correct point; and, in this case, it is therefore important that the angles of faces 5 and 6 be the same with respect to a median line,—that is, the cutting edge of the disk.

In the embodiment of the invention here shown it is preferred to mount the work holder 2 so that it may be swung to bring faces 5 and 6 parallel with the peripheral face of the grinding element 1. To this end, work holder 2 is pivotally mounted on pivot 7 and is provided with suitable means for supporting the work, this means, in the present instance, taking the form of a bearing 8 that supports a spindle 9 on which the cutter is mounted. The cutter may be held in position by a nut 10. Any means may be provided for rotating the work, if such operation be required, taking here the form of a pulley 11 that is carried by spindle 9 and having a countersunk part 12 in which fits a taper nut 13. Pulley 11 conveniently receives its motion from a pulley 14, on countershaft 15 carried by bracket 16 on uprights 17, by means of belt 18 and, in order that transmission of power to pulley 11 may be effected in any of its adjusted positions without the necessity of lengthening or shortening said belt, pivot 7 of work holder 2 is substantially in line with pulley 14. From this it will be understood that the transmission means adjusts itself automatically to correspond to the adjustment of the work holder. It will be noted from Fig. 11 that the center of rotation indicated by pivot 7 is not coincident with the face of the grinding element so that, when swinging the work holder, the cutting edges of the cutter will move away from the grinding element, as indicated in dotted lines, and will then move back again as it approaches its other position. It will also be noted from Fig. 8 that the median line defined by cutting edge 4 is substantially radial with respect to pivot 7. To avoid the necessity of careful adjustment when swinging the work holder from one position to another and, at the same time, to insure parallelism between the face to be ground and the grinding element, means are provided for obtaining definite angular adjustments of the work holder. These means here take the form of stops 19 and 20 on the framework and angular abutment faces 21 and 22 on the work holder. These angular abutment faces bear a definite relation to faces 5 and 6 in that they are at right angles thereto and extend with respect to the center of rotation afforded by spindle 9 at an angle equal to the angle between the median line defined by cutting edge 4 and faces 5 or 6. Thus, if faces 5 and 6 are thirty degrees from a line passing through cutting edge 4, abutment faces 21 and 22 are thirty degrees from the axis of spindle 9. If, as shown in Fig. 9, faces 5ª and 6ª are forty-five degrees from a line passing through cutting edge 4ª, then, as shown in Fig. 10, abutment faces 21ª and 22ª are forty-five degrees from line 9ª indicating the axis of rotation of the work. These different results may, of course, be obtained by attaching different angular abutment faces to the work holder but, in the present case, it is preferred to substitute different work holders when work having different angular faces is to be ground. It is customary in different size slitting machines to have cutters of different size, that is, cutters of various thicknesses. In order that the line defining the cutting edge 4 may be always substantially radial to pivot 7, advantage is taken of the fact that different thicknesses of cutters have different internal bores, and spindle 9 is accordingly provided with different bearing surfaces, such as 23 and 24, that fit the different bores of the cutters. Thus, as shown in Fig. 8, a cutter of the size indicated has a bore corresponding to bearing surface 23 and a thinner cutter will have a bore corresponding to bearing surface 24 and, in either case, the median line defined by cutting edge 4 will be substantially radial with respect to pivot 7. Pivot 7 is seated in an eccentric bushing 25 so that should there be a discrepancy, due to wear of the parts or other causes, it can be adjusted to shift the work holder and thereby also the median line defined by cutting edge 4. This eccentric bushing 25 is provided with teeth 26 and a screw 27 may be used to engage these teeth to retain the parts in a position to which they have been adjusted. Cutters also vary as to their diameters because of differences in size which exist sometimes for a purpose and again are due to wear. For this, and other reasons presently to be explained, it is desirable that the work holder be moved at right angles to face 5 in Fig. 8 so as to bring said face toward or away from the face of the grinding element 1. To accomplish this, pivot 7 is carried by a slide 28 movable in guides 29 as by means of a threaded stem 30 rotatable in a base plate 31. 32 indicates a raised track on base plate 31 on which the work holder travels as it is swung. To protect pivot 7 from dust, a dust box 33, having a receptacle 34 provided with a bottom partition 35 covering the pivot, is provided.

Grinding element 1 is rotatably mounted on shaft 36 which is carried by a housing 37, square in cross section, and slidably mounted in open face bearing blocks 38, so that the housing, with the shaft, is movable parallel to the angular face of the work to be ground, or lengthwise of the axis of the shaft. Shaft 36 is enclosed in the housing to protect it from dust; and the sliding movement of the housing is limited by surfaces 39 coming in contact with straps 100 spanning bearings 38. Shaft 36 carries a pulley 40 that receives motion from pulley 41 on counter-shaft 15 by means of belt 42 which is sufficiently flexible to admit of the sliding motion of housing 37.

Motion may be supplied to countershaft 15 in any suitable way, as by means of a loose and tight pulley; but, in the present instance, it is preferred to employ an electric motor 43 having a pulley 44 and a belt 45 passing over pulley 46 of the countershaft.

In practice, the cutter having been mounted on spindle 9, handle 47 of the work holder is grasped and the work holder is moved into the position indicated in Fig. 2 where it remains until face 6 of the cutter has been sufficiently ground. During this action, abrading wheel 1 and cutter 3 are rotated, preferably in opposite directions with respect to each other, and the operator may also slide abrading wheel 1 back and forth lengthwise of its axis. By preference, the parts will be so arranged that when abutment face 22 strikes stop 20, face 6 will not quite touch the grinding element and knurled piece 48 will then be rotated to actuate threaded stem 30 and thus press face 6 against the abrading surface. It will be understood, however, that approximately the same effect may be obtained by pressing against handle 47. It will also be noted that abutment face 22 is so related to stop 20 that the work holder is free to slide at right angles to the grinding face of the abrading wheel when moved under the influence of threaded stem 30. The same thing is true of stop 19 and abutment surface 21. When the grinding operation is finished on one face, handle 47 is grasped and the work holder is swung to the position indicated in Fig. 3, when face 5 is ground. To keep the track 32 clean, the work holder may be provided with felt cleaners 49.

I claim:

1. Grinding apparatus comprising: a grinding element, a work holder, a pivotal support for the work holder whereby said work holder may be swung with respect to the grinding element to effect different angular grinding relations between the two, and an adjustable eccentric bushing surrounding said pivot.

2. Grinding apparatus for cutters comprising: a grinding element, a work holder, a pivot on which the work holder swings, a rotatable work support for holding a cutter having a peripheral cutting edge and oppositely beveled sides, and means for adjusting the work holder to bring a median line through the cutter radial with the pivot so that the grinding action will be equal on both beveled sides and to bring the peripheral cutting edge of the cutter coincident with the median line through the cutter.

3. Grinding apparatus for cutters comprising: a grinding element, a work holder, a rotatable work support for holding a cutter having a peripheral cutting edge and oppositely beveled sides, a pivot on which the work holder swings to bring oppositely beveled sides of the cutter into grinding relation with the grinding element, stationary stops on the frame, and angular abutment surfaces on the work holder to cooperate with said stops and to thereby determine the angle of grinding.

4. Grinding apparatus for cutters comprising: a grinding element, a work holder, a rotatable work support for holding a cutter having a peripheral cutting edge and oppositely beveled sides, a pivot on which the work holder swings to bring oppositely beveled sides of the cutter into grinding relation with the grinding element, stationary stops on the frame, and abutment surfaces on the work holder to cooperate with said stops, said surfaces being at an angle to the center of rotation of the work support and the angle of grinding being equal to the angle between the axis of the work support and the abutment surfaces.

5. Grinding apparatus for cutters comprising: a grinding element, a work holder presenting different angular abutment surfaces at will, a rotatable work support for holding a cutter having a peripheral cutting edge and oppositely beveled sides, a pivot on which the work holder swings to bring oppositely beveled sides of the cutter into grinding relation with the grinding element, stops on the framework to engage the abutment surfaces to thereby limit the swinging movement of the work holder so that the angle of grinding may be determined by varying the angular relation between the axis of rotation of the work support and the abutment surfaces on the work holder.

Signed at Brooklyn, N. Y., in the county of Kings and State of New York, this 28th day of March 1921.

ROBERT McC. JOHNSTONE.